United States Patent
Senderos et al.

(10) Patent No.: US 11,628,499 B2
(45) Date of Patent: Apr. 18, 2023

(54) SYSTEMS, METHODS, AND PRODUCTS FOR CREATING GAS ATOMIZED METAL MATRIX COMPOSITE-BASED FEEDSTOCK FOR COLD SPRAY

(71) Applicant: The Boeing Company, Chicago, IL (US)

(72) Inventors: Bruno Zamorano Senderos, Huntsville, AL (US); Ali Yousefiani, Huntington Beach, CA (US); Michael B. Nicholas, Mesa, AZ (US); Rogie I. Rodriguez, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 16/698,730

(22) Filed: Nov. 27, 2019

(65) Prior Publication Data

US 2021/0154740 A1    May 27, 2021

(51) Int. Cl.
*B22F 9/08* (2006.01)
*C22C 1/05* (2006.01)
*C22C 1/051* (2023.01)

(52) U.S. Cl.
CPC .............. *B22F 9/082* (2013.01); *C22C 1/051* (2013.01); *B22F 2302/05* (2013.01); *B22F 2302/253* (2013.01)

(58) Field of Classification Search
CPC ................. B22F 9/082; B22F 2302/05; B22F 2302/253; C22C 1/051
See application file for complete search history.

(56) References Cited

U.S. PATENT DOCUMENTS

| 5,294,242 A | * | 3/1994 | Zurecki | ..................... B22F 9/14 |
| | | | | 75/10.1 |
| 5,980,604 A | * | 11/1999 | Lavernia | ................. C23C 4/123 |
| | | | | 148/415 |
| 2008/0152801 A1 | * | 6/2008 | DeBiccari | ................. C22C 1/05 |
| | | | | 427/201 |

OTHER PUBLICATIONS

Irissou, Eric, et al. "Investigation of Al—Al 2 O 3 cold spray coating formation and properties." Journal of Thermal Spray Technology 16.5-6 (2007): 661-668. (Year: 2007).*

* cited by examiner

*Primary Examiner* — Sally A Merkling
*Assistant Examiner* — Ricardo D Morales
(74) *Attorney, Agent, or Firm* — Barta, Jones & Foley, PLLC

(57) ABSTRACT

Implementations provide gas atomized metal matrix composite ("GAMMC")-based feedstock for cold spray additive manufacturing ("CSAM") enabling complex structural repairs. The feedstock is prepared by arranging a metal matrix composite (MMC) material in a gas atomization system, wherein the MMC material includes metal particles and ceramic particles. The feedstock is further prepared by performing gas atomization of the MMC material using the gas atomization system to atomize the MMC material, and producing a feedstock powder comprised of metal particles that are embedded with the ceramic particles from the atomized MMC material. The GAMMC-based feedstock comprises metallic (for binding to the substrate of the damaged part) and ceramic (for reinforcement) particles bonded together such that the ceramic particles bond directly to and within the metallic particles. GAMMC-based feedstock strengthens the repaired part and prevents degradation of the mechanical properties of the repaired part below stock specifications.

7 Claims, 8 Drawing Sheets

SYSTEMS, METHODS, AND PRODUCTS FOR CREATING GAS ATOMIZED METAL MATRIX COMPOSITE-BASED FEEDSTOCK FOR COLD SPRAY

BACKGROUND

Cold spray additive manufacturing ("CSAM") is usable to repair parts of vehicles and other items suffering corrosion or certain other damage. However, the feedstock material used in conventional CSAM ("traditional CSAM") is not sufficiently robust to meet the current commercial needs for such repair. In particular, while such parts are reparable using conventional CSAM, the resulting repaired parts often exhibit inferior mechanical properties to equivalent undamaged parts. Inferior mechanical properties render repaired parts unsuitable for use in applications requiring the parts to have stock mechanical properties (for instance, to meet specifications for proper functioning and safety).

Cold spray feedstock powder is typically of the same or similar chemical composition as the substrate alloy under repair. However, conventional CSAM generates and affixes to the repaired part a layer of material having reduced mechanical properties compared with the substrate of the part, due at least in part to use of conventional CSAM feedstock. In some conventional CSAM using industry best practices, repaired parts: (1) lose approximately twenty to twenty-five percent ultimate tensile strength; and (2) exhibit a fifty to seventy percent drop in strain-to-failure measurements relative to the original undamaged part.

When metal matrix composites ("MMC" or "MMCs") are created by or used in such conventional CSAM feedstock, metallic and ceramic powders or particles are mixed together, and the ceramic particles (for reinforcement) do not bond to the metallic particles (for bonding to the substrate). Instead, conventional CSAM feedstock is comprised of a plurality of metal particles having a plurality of surfaces, with ceramic particles fixed to the plurality of surfaces. Even before application to a part, conventional CSAM feedstock possesses inferior mechanical properties to the original undamaged substrate of a part. While CSAM strengthens the part under repair, this lack of bonding degrades the structural integrity of the repaired part. Using this conventional CSAM MMC feedstock generates interface defects between the substrate of the part and the applied feedstock and lowers the overall performance and mechanical properties of the repaired part.

Some conventional CSAM uses heat treatment of the MMC feedstock to attempt to ameliorate these deficiencies. However, heat treatment cannot put the mechanical properties of the repaired part on par with the mechanical properties of an undamaged part. Thus, without a better performing MMC feedstock, the range of materials repairable by CSAM in a commercially practicable fashion is limited, and the commercial use of CSAM is therefore constrained.

SUMMARY

Some implementations provide a gas atomization system for producing a feedstock powder for cold spraying. The gas atomization system includes an intake sub-system configured to receive a metal matrix composite (MMC) material. The MMC material comprises metal particles and ceramic particles. The gas atomization system further includes an atomizer sub-system configured to conduct gas atomization of the MMC material. The atomizer sub-system includes a heating unit configured to heat the MMC material to a temperature for gas atomization; a pressurization unit configured to apply a gas stream at a gas pressure for gas atomization; and a flow regulation unit configured to maintain a metal flow rate for gas atomization. The gas atomization includes atomizing the MMC material at the gas pressure and the metal flow rate; while maintaining the temperature of the MMC material; and producing the feedstock powder comprised of the metal particles that are embedded with the ceramic particles from the atomized MMC material.

Other implementations provide a method for producing feedstock for cold spraying. The method includes arranging a metal matrix composite (MMC) material in a gas atomization system. The MMC material comprises metal particles and ceramic particles. The method further includes performing gas atomization of the MMC material using the gas atomization system to atomize the MMC material; and producing a feedstock powder comprised of metal particles that are embedded with the ceramic particles from the atomized MMC material.

Still other implementations provide a feedstock for cold spraying prepared by a process. The process includes arranging a metal matrix composite (MMC) material in a gas atomization system. The MMC material comprises metal particles and ceramic particles. The process further includes performing gas atomization of the MMC material using the gas atomization system to atomize the MMC material; and producing a feedstock powder comprised of metal particles that are embedded with the ceramic particles from the atomized MMC material.

This Summary is provided to introduce a selection of concepts in a simplified form that are further described below in the Detailed Description. The foregoing Summary, as well as the following Detailed Description of certain implementations, will be better understood when read in conjunction with the appended drawings. This Summary is not intended to identify key features or essential features of the claimed subject matter, nor is it intended to be used as an aid in determining the scope of the claimed subject matter.

BRIEF DESCRIPTION OF THE DRAWINGS

These and other features, aspects, and advantages of the present disclosure will become better understood when the following detailed description is read with reference to the accompanying drawings, wherein.

Corresponding reference characters indicate corresponding parts throughout the drawings in accordance with an implementation.

DETAILED DESCRIPTION

Figure 1:
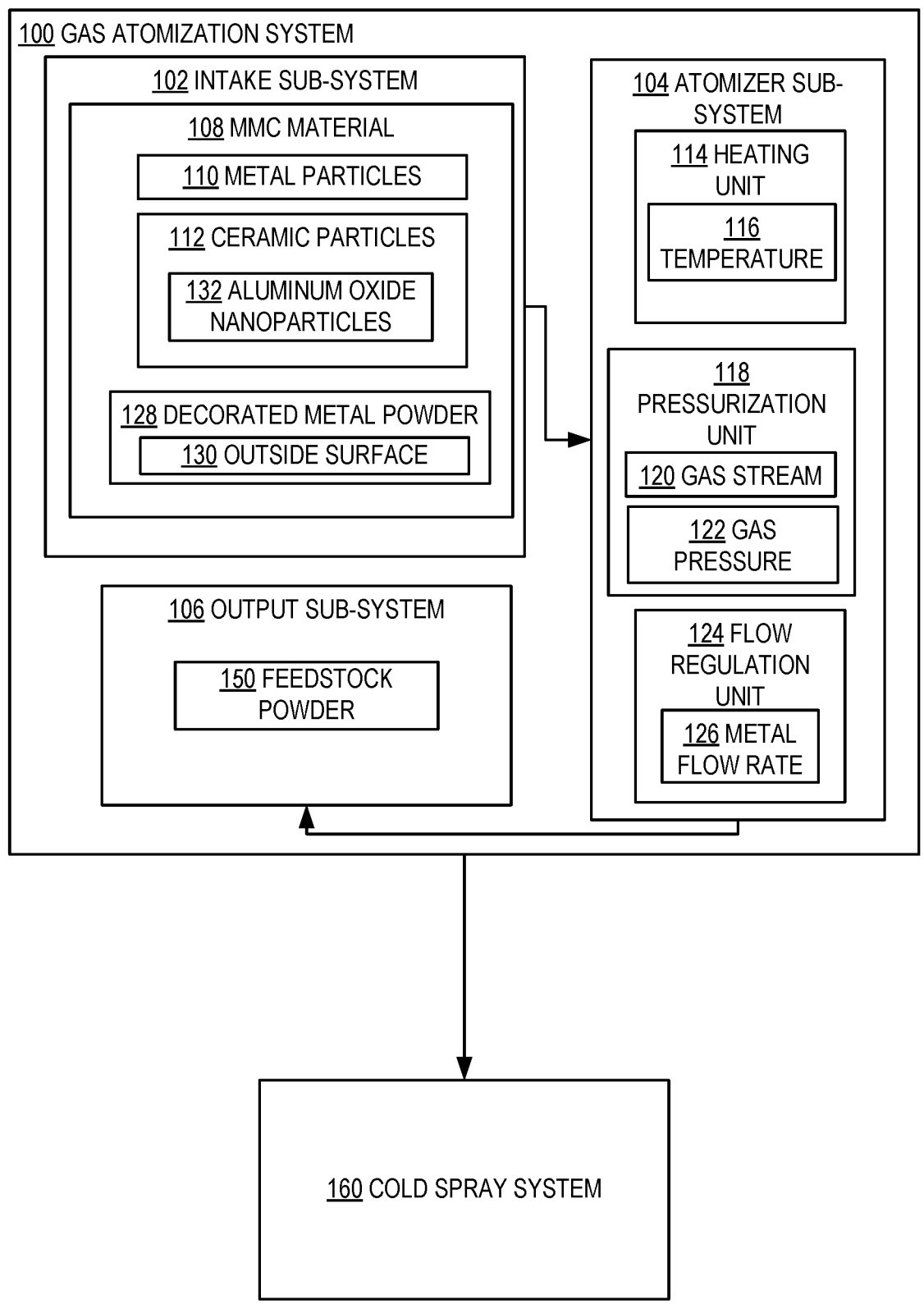
FIG. 1 is a block diagram illustration of a gas atomization system in accordance with an implementation.

Cold spray additive manufacturing (also "cold spray" or "CSAM" herein) is a material-deposition process where metal or metal-ceramic mixtures of powders (also referred to as "particles" herein) suspended in a gas propelled at supersonic speed are used to form a coating or freestanding structure. Specifically, cold spraying is defined herein as spraying a material at a temperature that is below the melting point of the material being sprayed. CSAM is a solid state process: neither the powders nor the substrate to which the powders are applied are melted during the process. Thus, use of CSAM provides material-deposition that does not cause thermally induced alterations to the substrate or powder (e.g., deformation, crystallization, imperfections, or other types of damage). Due to the direct impingement of the gases carrying the powders upon the substrate, cold spray generates a stationary shock wave and also a lateral flow of gas along the surface of the part subject to CSAM.

High- and low-pressure cold spray is an emerging technology finding increasing applications in various types of structural repairs. In some implementations, cold spray is usable to repair metallic structures (e.g., airplane or helicopter components). An example of an implementation of a CSAM apparatus and process is provided in the discussion of FIG. 5 herein.

Referring to the figures, implementations of the disclosure include systems, methods, and products for creating gas atomized metal matrix composite ("GAMMC" or "GAMMCs")-based feedstock for CSAM. The quality of CSAM-based repairs, and in particular the mechanical properties of a part subject to CSAM-based repair, are dependent on the feedstock used. GAMMC-based feedstock is more robust than and possesses mechanical properties sufficiently superior to conventional or traditional CSAM feedstock to enable CSAM to meet the current need for commercially practicable CSAM-based repair across a wider variety of parts of vehicles and other items. In some implementations, parts repaired via CSAM using GAMMC-based feedstock exhibit mechanical properties at least equal to or superior to the mechanical properties of the part in an undamaged state. In other implementations, parts repaired via CSAM using GAMMC-based feedstock retain sufficiently robust mechanical properties that such parts remain suitable for use in applications requiring the parts to have at least stock mechanical properties (for instance, to meet specifications for proper functioning and safety). Further, in some implementations, in comparison to parts repaired using conventional CSAM feedstock, parts repaired via CSAM using GAMMC-based feedstock do not exhibit: (1) a loss of at least twenty percent of the ultimate tensile strength ("UTS") relative to the original undamaged parts; or a fifty to seventy percent drop in strain-to-failure ("STF") measurements relative to the original undamaged parts.

When GAMMC-based feedstock is created for CSAM, metallic and ceramic powders or particles are bonded together such that the ceramic particles (for reinforcement) bond directly to the metallic particles (for binding to the substrate), instead of the ceramic particles merely being affixed to surface of the metallic particles as in traditional CSAM feedstock. GAMMC-based feedstock thus has superior mechanical properties to traditional CSAM feedstock before use. Use of GAMMC-based feedstock in CSAM applications thus both strengthens the part and, via this bonding, and prevents degradation of structural integrity by maintaining (or in some implementations improving) the mechanical properties of the substrate of the repaired part, such that the mechanical properties remain sufficiently robust. Such repaired parts thus remain suitable for use in applications requiring the parts to have at least stock mechanical properties. Using GAMMC-based feedstock in CSAM applications also reduces (or in some implementations, avoids completely) the generation of interface defects between the substrate of the part and the applied feedstock, while at least maintaining the overall performance and mechanical properties of the repaired part. In the context of this disclosure, an interface defect between two surfaces (e.g., the surface of the substrate of the part and the surface of the cold sprayed feedstock particles) refers to flaws in the bonding between those surfaces. Such interface defects negatively impact mechanical properties.

The elements described herein in various implementations operate in an unconventional manner to provide systems, methods, and products for creating GAMMCs for CSAM by improving the mechanical properties of the feedstock used in CSAM applications. Such improvement enables complex structural repairs of devices, vehicles (e.g., aircraft, watercraft, land vehicles, etc.), and buildings that are infeasible with conventional CSAM feedstock. GAMMC-based feedstock facilitates bonding between the substrate of a part and the cold sprayed GAMMC-based feedstock through a metallic surface in the GAMMC-based feedstock powder. Ceramic particle reinforcement intimately attached to the interior of the GAMMC-based feedstock particles further enhances the mechanical properties of the GAMMC-based feedstock.

Further, GAMMC-based feedstock does not require the use of heat treatment specifically to attempt to lessen the degradation of mechanical properties of the feedstock on application to a part during CSAM-based repairs. Use of GAMMC-based feedstock in CSAM-based repairs is more effective in maintaining the mechanical properties of the repaired part than heat treating traditional CSAM feedstock before use.

Additionally, GAMMC-based feedstock simplifies the supply chain of a repairer by virtue of being usable on a wider variety of parts subject to repair and allows repairers to make new types of repairs available (e.g., new service SKUs in the commercial repair context). CSAM-based repairs using GAMMC-based feedstock enable the manufacture of higher performance parts than are manufacturable by traditional CSAM techniques using traditional CSAM feedstock. In some implementations, GAMMC-based feedstock provides a ten KSI improvement in UTS. While there is thus no need for feedstock particle size optimization or CSAM process optimization to achieve UTS improvement, some implementations include optional further optimization of feedstock particle size or the CSAM process to achieve further UTS improvements, other mechanical property-related benefits, general quality control improvements, or other similar benefits.

The implementations of the present disclosure are thus superior to typical implementations of systems, methods, and products for creating conventional CSAM feedstock that fail completely to address the degradation of mechanical properties and the associated restriction in useful repair applications endemic to the resultant traditional CSAM feedstock. In some implementations, the performance of implementations of the systems, methods, and products for creating gas atomized metal matrix composites for cold spray disclosed herein, as measured by the mechanical properties of either the disclosed GAMMC-based feedstock or parts repaired via CSAM using the disclosed GAMMC-based feedstock substantially equals and sometimes exceeds conventional existing contemporary the systems, methods, and products for creating traditional CSAM feedstock that introduce inherent and unavoidable loss or degradation of mechanical properties as discussed elsewhere herein.

The GAMMC-based feedstock is thus mechanically more robust and more cost effective to implement, while at the same time being more effective than conventional systems, methods, and products for creating traditional CSAM feedstock for cold spray at producing a GAMMC-based feedstock whose mechanical properties render the GAMMC-based feedstock commercially practicable for a wider variety CSAM-based repair applications than traditional CSAM feedstock.

Referring particularly to FIG. 1, this figure is a block diagram illustration of a gas atomization system 100 in accordance with an implementation. Gas atomization is a technique whereby high quality metallic powders are manufactured. In some implementations of gas atomization, molten metal is atomized using jets of inert gas, resulting in fine droplets of molten metal. The droplets descend down an atomizing tower. The droplets cool during the descent, resulting in metallic powder. Some implementations of gas atomization result in powders having a perfectly spherical shape, a high cleanliness level, and enhanced mechanical properties compared to metallic powders created using other atomization techniques.

Implementations of the gas atomization system 100 produce a feedstock powder 150 for cold spraying. In some implementations, the feedstock powder 150 is a GAMMC-based feedstock powder. The gas atomization system 100 comprises an intake sub-system 102 configured to receive a metal matrix composite (MMC) material 108. The MMC material 108 comprises metal particles 110 and ceramic particles 112. In some implementations, the MMC material 108 is a bar stock of decorated metal powder 128 that has been consolidated. The bar stock of decorated metal powder 128 has the ceramic particles 112 on an outside surface 130 of the metal particles 110 thereof. In some such implementations, the ceramic particles 112 comprise nanoparticles or microparticles 132 of at least one of aluminum oxide or titanium diboride.

The gas atomization system 100 further comprises an atomizer sub-system 104 configured to conduct gas atomization of the MMC material 108. The atomizer sub-system 104 comprises a heating unit 114 configured to heat the MMC material 108 to a temperature 116 for gas atomization; a pressurization unit 118 configured to apply a gas stream 120 at a gas pressure 122 for gas atomization; and a flow regulation unit 124 configured to maintain a metal flow rate 126 for gas atomization. The gas atomization comprises atomizing the MMC material 108 at the gas pressure 122 and the metal flow rate 126, while maintaining the temperature 116 of the MMC material 108. The gas atomization produces the feedstock powder 150 comprised of the metal particles 110 that are embedded with the ceramic particles 112 from the atomized MMC material 108. In some implementations, the temperature 116 is in a range from the melting temperature of the MMC material 108 to the melting temperature of the MMC material 108 plus 300 degrees Celsius; the gas pressure 122 is in a range of 10-30 bars (e.g., 10 bars, 11 bars, 12 bars, etc.); and the metal flow rate 126 is in a range of 0.2 to 2 kilograms per minute (e.g., 0.2, 0.3, 0.4, etc. kilograms per minute). However, other values and ranges are contemplated. For example, the melting temperature can be the melting temperature of the MMC material 108 plus 290-310 degrees Celsius. The gas atomization comprises, for example, at least one of a non-cold spray gas atomizing process or a cold spray gas atomizing process.

In some implementations, the gas atomization system 100 further comprises an output sub-system 106 configured to output the feedstock powder 150 to a cold spray system 160 in a secondary consolidation step. In some such implementations, the cold spray system 160 gas atomizes the supplied feedstock powder 150.

The gas atomization system 100 or the cold spray system 160 further comprises an induction driven gas atomizer configured to atomize a bar of feedstock. In such implementations of the gas atomization system 100, the MMC material 108 received by the intake sub-system 102 is consolidated into a bar using a secondary consolidation step. Usable secondary consolidation steps include, but are not limited to, spark plasma sintering ("SPS") or extrusion. The consolidated bar is then gas atomized by the atomizer sub-system 104 to produce a feedstock powder 150 with a more homogeneous distribution of particles than, e.g., the bar stock of decorated metal powder 128.

In some other implementations, the gas atomization system 100 or the cold spray system 160 is configured to conduct melted pool gas atomization of the MMC material 108. Such implementations are operable when the MMC material 108 is in either the form of a bar or feedstock powder. Melted pool gas atomization is faster than induction driven gas atomization, while induction driven gas atomization produces a more homogeneous result. Whether induction driven gas atomization or melted pool gas atomization is used depends on the needs of a particular application of the disclosure.

Figure 2:
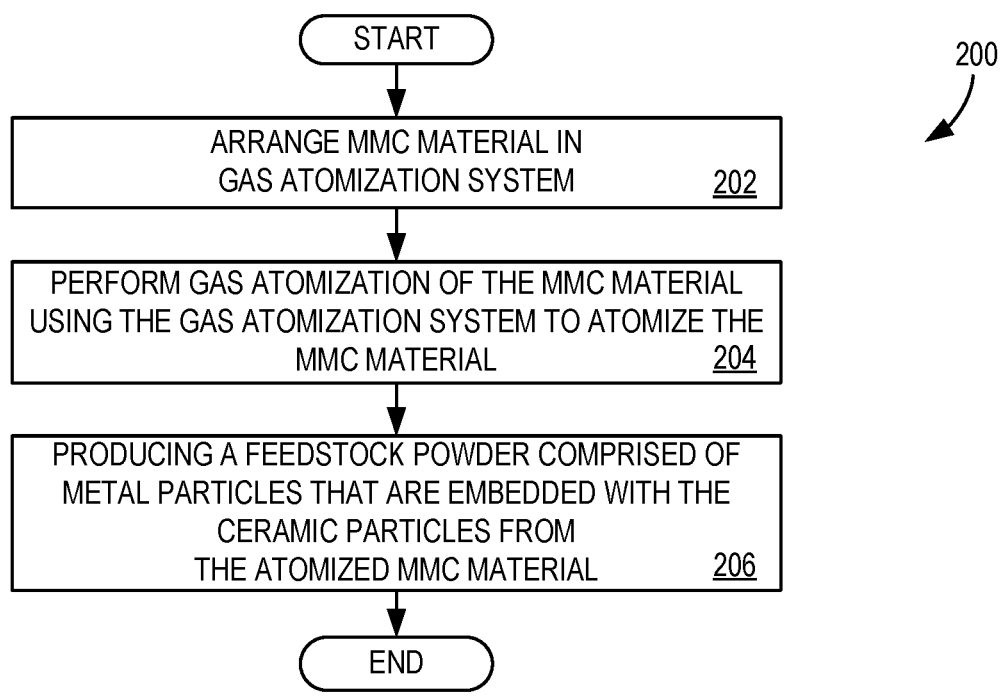
FIG. 2 is a flowchart illustrating a method for producing feedstock for cold spraying in accordance with an implementation.

FIG. 2 is a flowchart illustrating a method 200 for producing feedstock (e.g., the GAMMC-based feedstock powder 150 of FIG. 1) for cold spraying in accordance with an implementation. The process shown in FIG. 2 is performed by, at least in part, a gas atomization system having an intake sub-system, an atomizer sub-system, and an output sub-system, such as the gas atomization system 100, the intake sub-system 102, the atomizer sub-system 104, and the output sub-system 106 in FIG. 1. The method 200 arranges a metal matrix composite (MMC) material in a gas atomization system at operation 202. The MMC material comprises metal particles and ceramic particles. In some implementations, the MMC material is a bar stock of decorated metal powder that has been consolidated. The bar stock of decorated metal powder has an at least one ceramic particle on an outside surface of an at least one metal particle thereof. In some such implementations, the ceramic particles comprise nanoparticles or microparticles of at least one of aluminum oxide or titanium diboride.

The method 200 further performs gas atomization of the MMC material using the gas atomization system to atomize the MMC material at operation 204; and produces a feedstock powder comprised of metal particles that are embedded with the ceramic particles from the atomized MMC material at operation 206. In some implementations, performing the gas atomization at operation 204 comprises atomizing the MMC material at a gas pressure in a range of 10-30 bars and a metal flow rate in a range of 0.2-2 kilograms per minute, wherein the MMC material is at a temperature in a range from the melting temperature of the MMC material to the melting temperature of the MMC material 108 plus 300 degrees Celsius. In other implementations, the gas atomization comprises at least one of a non-cold spray gas atomizing process or a cold spray gas atomizing process.

Thereafter, the process is complete. While the operations illustrated in FIG. 2 are performed by, at least in part, a gas atomization system having an intake sub-system, an atomizer sub-system, and an output sub-system, aspects of the disclosure contemplate performance of the operations by other entities. In some implementations, a cloud service performs one or more of the operations (e.g., by controlling the atomizer sub-system to cause gas atomization to produce the feedstock powder).

Figure 3:
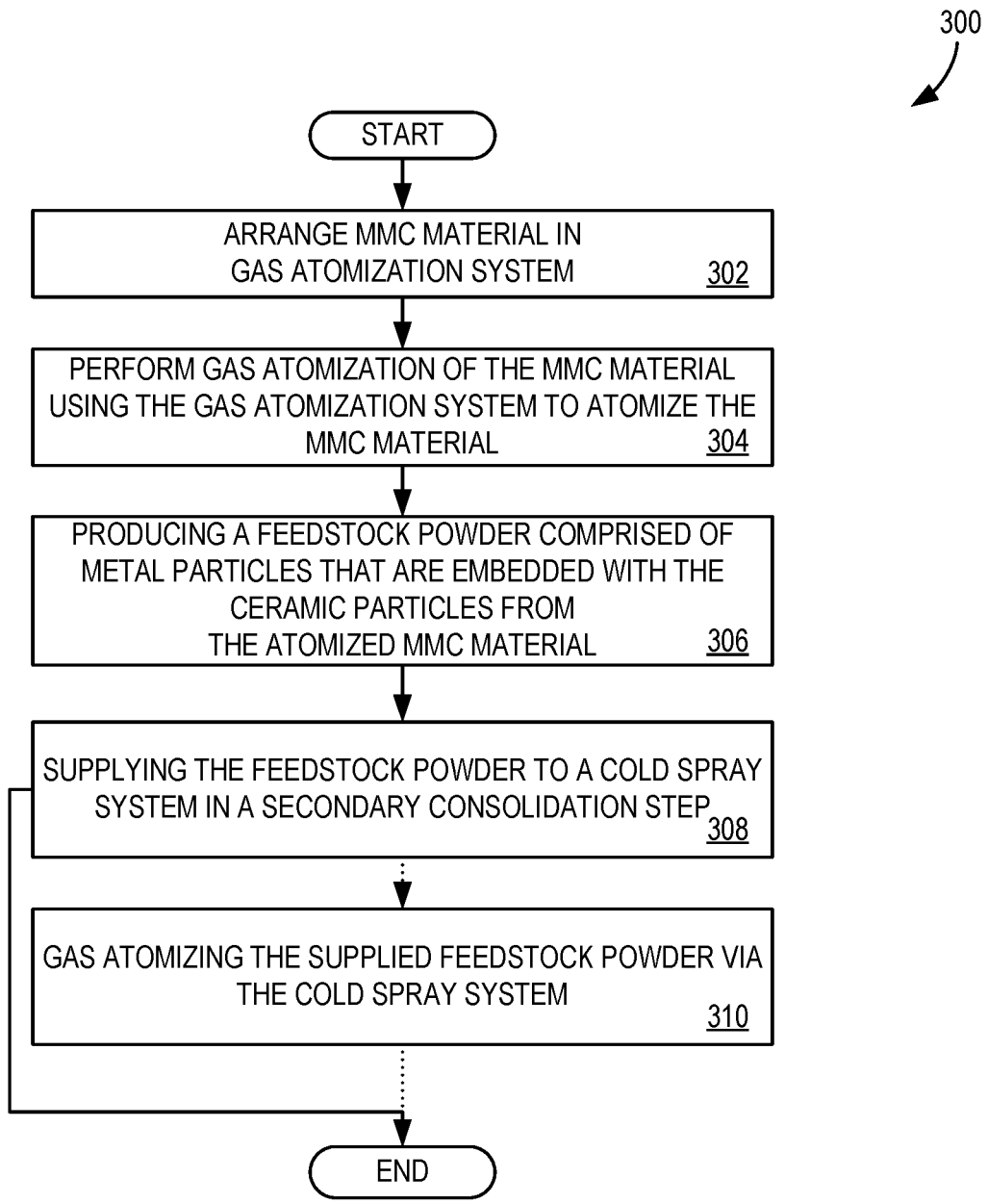
FIG. 3 is a flowchart illustrating another method for producing feedstock for cold spraying in accordance with an implementation.

FIG. 3 is a flowchart illustrating another method 300 for producing feedstock (e.g., the GAMMC-based feedstock powder 150 of FIG. 1) for cold spraying in accordance with an implementation. In some implementations, the process shown in FIG. 3 is performed by, at least in part, a gas atomization system having an intake sub-system, an atomizer sub-system, and an output sub-system, such as the gas atomization system 100, the intake sub-system 102, the atomizer sub-system 104, and the output sub-system 106 in FIG. 1. Operations 302, 304, and 306 are similar to operations 202, 204, and 206 of the method 200 depicted in FIG. 2, and accordingly the description will not be repeated. In some implementations, the method 300 further comprises supplying the feedstock powder to a cold spray system in a secondary consolidation step at operation 308. In some implementations comprising operation 308, the method 300 optionally gas atomizes the supplied feedstock powder using the cold spray system at operation 310.

Thereafter, the process is complete. While the operations illustrated in FIG. 2 are performed by, at least in part, a gas atomization system having an intake sub-system, an atomizer sub-system, and an output sub-system, aspects of the disclosure contemplate performance of the operations by other entities. In some implementations, a cloud service performs one or more of the operations (e.g., by controlling the atomizer sub-system to cause gas atomization to produce the feedstock powder).

Figure 4:
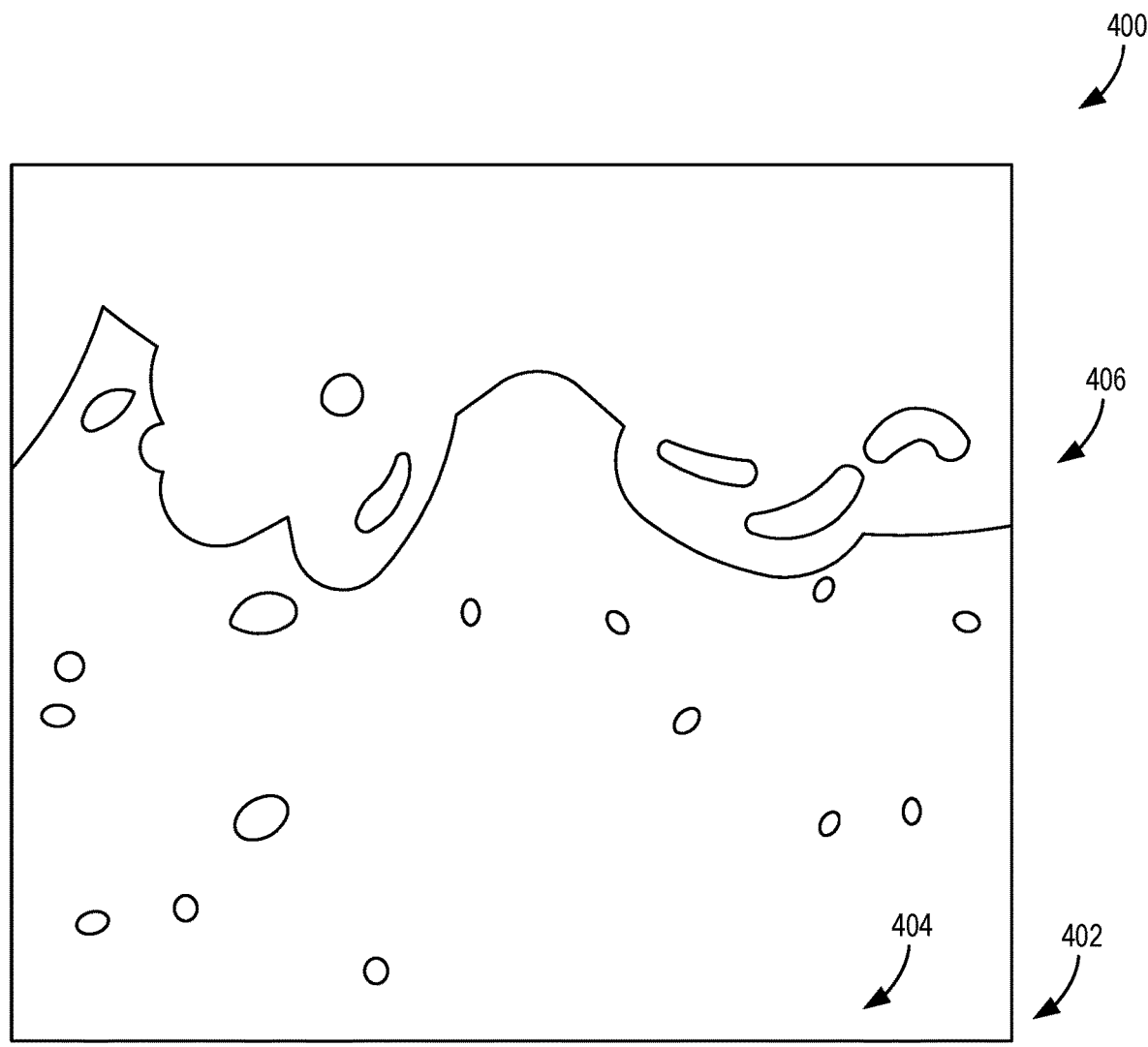
FIG. 4 is an illustration of an EDS X-ray map showing mechanical mixing between a cold sprayed material and a substrate of a part subject to a CSAM-based process in accordance with an implementation.

FIG. 4 is an illustration of an EDS X-ray map 400 showing mechanical mixing between a cold sprayed material and a substrate of a part subject to a C SAM-based process in accordance with an implementation. As used herein, each of "EDS," "EDX," "EDXS," or "XEDS" refers to energy-dispersive X-ray spectroscopy. These abbreviations are interchangeable for purposes of this disclosure, unless otherwise noted. In some implementations, EDS is referred to as at least one of energy dispersive X-ray analysis (EDXA) or energy dispersive X-ray microanalysis (EDXMA). EDS is an analytical technique used to conduct elemental analysis or chemical characterization of a sample. An EDS X-ray map (e.g., the EDS X-ray map 400) uses EDS data to present information on the elemental or other material distributions within a sample in graphical form. EDS X-ray maps reveal which elements or other material are responsible for variations in the composition of the sample.

The EDS X-ray map 400 illustrates mechanical mixing and bonding within a part 402. The part 402 has a metallic substrate 404. During cold spray-based repair operations utilizing a GAMMC-based feedstock powder 406 (e.g., the GAMMC-based feedstock powder 150 of FIG. 1), metallic particles within the substrate 404 mechanically mix with and bond directly to the GAMMC particles within the a GAMMC-based feedstock powder 406, as described in detail elsewhere herein. The GAMMC-based feedstock powder 406 does not merely form a parallel layer proximate to the substrate 404. Rather, the metallic particles within the GAMMC-based feedstock powder 406 are able to mechanically bond with the metallic substrate 404. The metallic particles within the GAMMC-based feedstock powder 406 are reinforced with ceramic particles at least partially inside the metallic particles, such that the mechanical properties of the repaired part 402 are improved in comparison to traditional CSAM-based repairs using traditional CSAM feedstock.

In some implementations, the GAMMC-based feedstock powder 406 is a feedstock for cold spraying prepared by a process. The process comprises arranging an MMC material in a gas atomization system (e.g., operation 202 of FIG. 2). The MMC material comprises metal particles and ceramic particles. The process further comprises performing gas atomization of the MMC material using a gas atomization system to atomize the MMC material (e.g., operation 204 of FIG. 2). In some implementations, the gas atomization is performed at defined operating levels, such as atomizing the MMC material at a gas pressure in a range of 10-30 bars and a metal flow rate in a range 0.2-2 kilograms per minute, wherein the MMC material is at a temperature in a range from the melting temperature of the MMC material to the melting temperature of the MMC material plus 300 degrees Celsius. In some other implementations, the gas atomization comprises at least one of a non-cold spray gas atomizing process or a cold spray gas atomizing process.

In some implementations, the MMC material is a bar stock of decorated metal powder that has been consolidated; the bar stock of decorated metal powder having an at least one ceramic particle on an outside surface of an at least one metal particle thereof. In some such implementations, the ceramic particles comprise nanoparticles or microparticles of at least one of aluminum oxide or titanium diboride. The process additionally comprises producing a feedstock powder comprised of metal particles that are embedded with the ceramic particles from the atomized MMC material (e.g., operation 206 of FIG. 2). In some implementations, use of the feedstock in cold spraying-based repair of a part improves mechanical properties of the repaired part.

Figure 5:
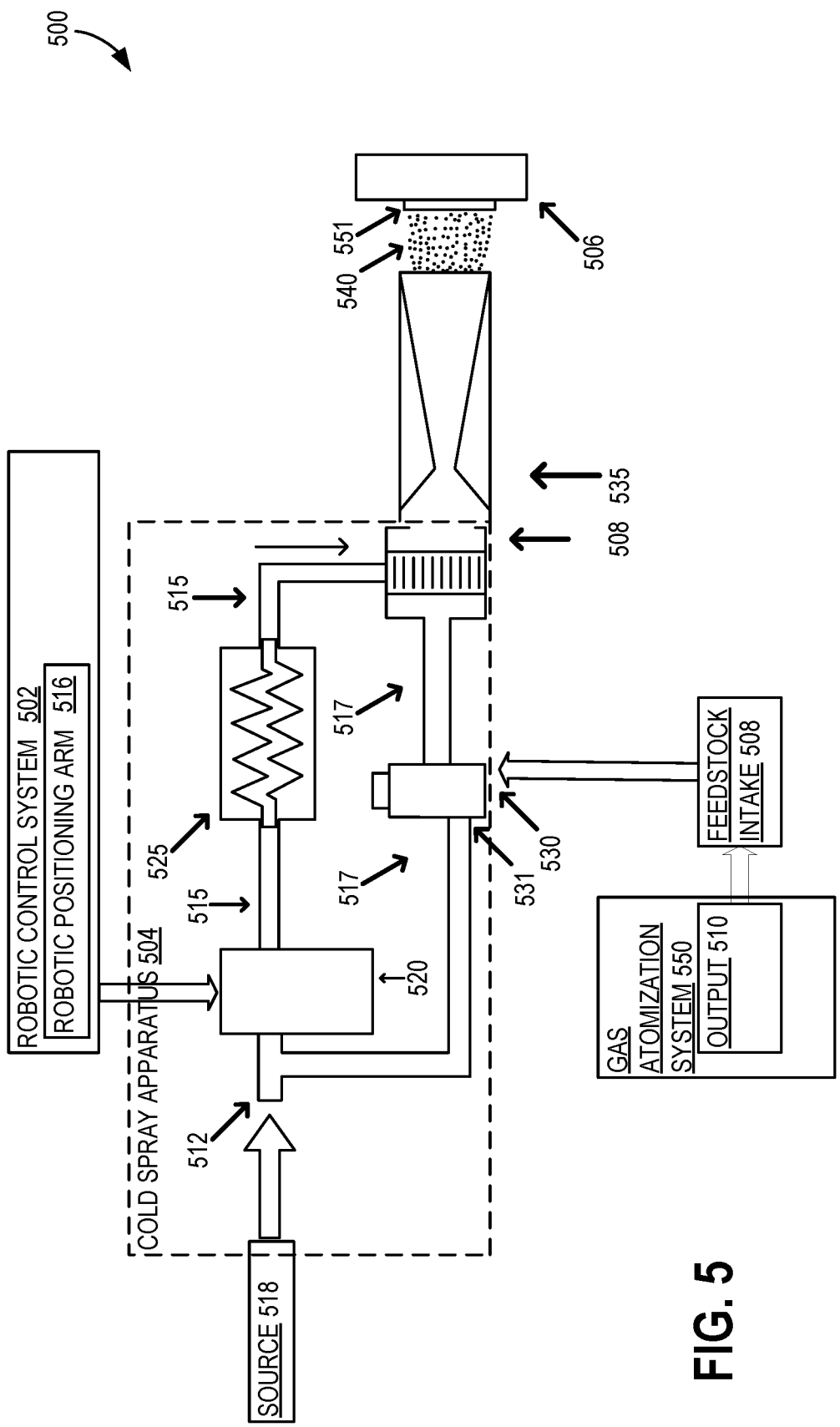
FIG. 5 is a block diagram illustrating an operating environment showing an implementation of a system for performing cold spray additive manufacturing in accordance with an implementation.

FIG. 5 is a block diagram illustrating an operating environment showing an implementation of a system for performing cold spray additive manufacturing in accordance with an implementation. The system 500 comprises a robotic control system 502 configured to control a cold spray apparatus 504. In some implementations, the robotic control system further comprises a robotic positioning arm 516 (e.g., a robotically controlled mechanical arm). In some implementations, the robotic control system 502 is a manual or at least partially automated apparatus. In some such implementations, the robotic control system is controllable using a computing device, such as the computing device 800 of FIG. 8 herein. In some implementations, the robotic positioning arm 516 is at least a five-axis positioning system that includes two axes for positioning in a plane of the part under repair, one axis for the standout distance, and two additional axes for additional requisite positioning. Alternatively, the robotic positioning arm 516 is at least a two axis positioning system for XY positioning in the plane of part under repair and a rolling system that maintains parallelism and standout distance with the substrate of the part under repair. The robotic positioning arm 516, in some implementations, is an ADEPT® Viper robot from Omron Adept Technologies, Inc. The robotic positioning arm 516, in some other implementations, is another commercial device or combination of devices having similar capabilities to the ADEPT® Viper.

The cold spray apparatus 504 of the system 500 further comprises a supersonic nozzle 535 and is configured to perform cold spray additive manufacturing of a part 506. In some implementations, the cold spray apparatus 504 is further configured to cold spray a powder 530 (e.g., the feedstock powder 150 of FIG. 1) onto a substrate 551 of the part 506. In such implementations, the cold spray apparatus 504 further comprises a source 518 of gas 512 connected to a gas control module 520. The gas control module 520 controls the flow of the gas 512 through a first line 515 connected to the supersonic nozzle 535 and through a second line 517 connected to a powder chamber 531 and then to the supersonic nozzle 535. The cold spray apparatus 504 additionally comprises a heater 525 that heats the gas 512 to a requisite temperature prior to entrance of the gas 512 into the supersonic nozzle 535. In some implementations, the substrate 551 is also heated to further facilitate mechanical bonding.

In operation, the gas 512 flows through the first line 515 and the second line 517 causing the powder 530 located within the powder chamber 531 to be sprayed in a supersonic gas jet from the supersonic nozzle 535 as a particle stream 540. The particle stream 540 is sprayed at a temperature below the melting point of the powder 530 and travels at a supersonic velocity from the supersonic nozzle 535. In some implementations, the particle stream 540 travels at several times the speed of sound. (The exact speed of sound at a given time varies depending on local conditions). In some implementations, the particle stream 540 travels at least two- to four-times the speed of sound. The particle stream 540 is deposited on the substrate 551 of the part 506, whereby on impact on the substrate 551, particles of the particle stream 540 undergo plastic deformation due to the supersonic velocity of the particle stream 540 and bond to each other and the substrate 551 of the part 506 using mechanical energy. The heater 525 accelerates the speed of the particle stream 540, but the heat from the heated gas 512 is not transferred to the bonding of the particles of the particle stream 540. Thus, the heat cannot cause deformities, warping, stresses, or other deleterious impacts to the bonding. In some implementations, once the cold spray process is complete the substrate 551 is further processed, such as polished to create or restore a smooth finish. In some implementations, the robotic positioning arm 516 is configured to avoid maintaining a single position for so long as to transfer sufficient heat to generate heat damage on or impact the heat treatment of the substrate 551.

Some implementations of the system 500 further include a feedstock intake 508. The feedstock intake 508 is configured to receive the powder 530. In some implementations, the feedstock intake 508 is coupled to an output 510 from a gas atomization system 550, such as the output sub-system 106 of the gas atomization system 100 of FIG. 1. The feedstock intake 508 in such implementations thus enables the system 500 to receive GAMMC-based feedstock-based powder 530 directly from the gas atomization system, such that the GAMMC-based feedstock-based powder 530 is ready for immediate use in CSAM operations.

FIG. 5 depicts, and the above paragraphs describe, implementations wherein the robotic control system 502, comprising the robotic positioning arm 516, is configured to control the entire cold spray apparatus 504 (a "fully-mobile robotic CSAM system"). In some implementations (not shown in the drawings), some components of the cold spray apparatus 504 are at least partially stationary in use (a "partially-stationary robotic CSAM system" herein). In some implementations of such partially-stationary robotic CSAM systems, during CSAM operations as described herein the robotic control system 502 uses the robotic positioning arm 516 to move only the supersonic nozzle 535.

In implementations of the partially-stationary robotic CSAM system, operation of the system 500 as described above is otherwise unchanged, except that the supersonic nozzle 535 is moved by the robotic control system 502 independently of the remainder of the components of the cold spray apparatus 504 and the gas atomization system 550. Whether an implementation of the disclosure utilizes the fully-mobile robotic CSAM system; the partially-stationary robotic CSAM system; or a combination thereof is dependent on the needs and conditions of a particular application. Such needs and conditions include, but are not limited to, whether at least one of the robotic control system 502 or the cold spray apparatus 504 are intended to be portable; the amount of open space in which the robotic positioning arm 516 is free to move anything attached to the robotic positioning arm 516, and the weight-bearing or actuation capacity of the robotic positioning arm 516.

Additional Examples

In general, there are two types of cold spray repair techniques. Non-Structural Cold Spray is concerned with adding thickness to a part or restoring geometric volume but does not provide any improvement in the load bearing strength of the repaired part. This technology has been developed and matured to the point that the United States Department of Defense has installed Non-Structural Cold Spray repair systems at many depots for conducting repairs including but not limited to correcting casting defects and handling damage and wear of sealing surfaces.

Various implementations of the disclosure herein are targeted to Structural Cold Spray, which is concerned not merely with adding thickness to existing parts but reconditioning and repair of damaged, worn, or otherwise out of spec parts having load bearing capability and responsibility. Among other applications, Structural Cold Spray is suitable to repair corrosion, repair cracks, or restore tolerances/exact dimensions. Additionally, some implementations of Structural Cold Spray do not require stripping and reapply the finish of the part subject to repair. As disclosed herein, CSAM mechanically bonds particles to a substrate using purely mechanical energy, with no need for added adhesives.

Repair processes using conventional CSAM and traditional CSAM feedstock are suitable for coating restoration (e.g., replacing cladding by use of CSAM) and non-structural dimensional restoration (restoration wherein the cold sprayed material does not carry any load, including restoration of structural parts (e.g., gearboxes)). However, conventional CSAM and conventional CSAM feedstock are unsuitable as described elsewhere herein for non-critical structural repair (wherein the cold-sprayed part carries a load and the repaired device will still operate if the repaired part fails); semi-critical structural repair (wherein the cold sprayed part carries a load and the repaired device will be damaged or malfunction if the repaired part fails); and critical structural repairs (wherein the cold sprayed part carries a load the repaired device will be lost or destroyed if the repaired part fails). CSAM repair processes using some implementations of GAMMC-based feedstock as disclosed herein are by contrast suitable for use in non-critical structural repairs, semi-critical structural repairs, and critical structural repairs, depending on the intended application.

KSI is used to measure tensile strength and other material characteristics in the disclosure herein. KSI is a scaled unit derived from pounds per square inch (pound-force per square inch or "psi"). The psi is a unit of pressure or stress based on avoirdupois units, and indicates pressure resulting from a force of one pound-force applied to an area of one square inch. One KSI is equivalent to a thousand psi. Any other unit of measure serving the same purpose is substitutable for KSI. Other suitable units include but are not limited to kilopascals (kPa); technical atmospheres (at); standard atmospheres (atm); Torr units (torr); and bars. The unit of measure chosen for a specific implementation depends on the needs of the intended application.

Unless explicitly stated otherwise, in some implementations, "feedstock" and "feedstock powder" are interchangeable as used herein. "Decorated" particles, as used herein, are particles with satellite particles fixed thereto. "Bar stock," as used herein, refers in some implementations to a bar created by pressing material on a hot press and extruding that material into a bar for later manufacturing use. In some implementations of the GAMMC-based feedstock powder disclosed herein, reinforcing decorations (e.g., ceramic particles) are embedded inside individual metallic particles of the feedstock powder. Such implementations of the disclosed GAMMC-based feedstock powder avoid the negative performance impacts of using MMC bar stock to create non-gas atomized MMC CSAM feedstock. In particular, impact of non-gas atomized MMC CSAM feedstock powder during CSAM operations causes excessive and undesirous decoration occur at the splash boundaries of the substrate and the cold sprayed feedstock powder. Such decorations create weak areas in the cold spray layer. These areas lack reinforcement, increasing the likelihood of structural failure in the repaired part.

Attempting to merely grind the MMC bar stock into powder for use in CSAM-based repairs yields similarly inferior results, as the grinding results in misshapen (elongated) particles having boundaries between the metal and ceramic components, as well as leaving a significant and detrimental number of ceramic particles on the surface. Such ground powder cannot be used for CSAM without significant post-processing, and still will not perform as well as the disclosed GAMMC-based feedstock powder. The disclosed GAMMC-based feedstock does not have the flaws described above.

Certain implementations herein utilize ceramic particles comprising nanoparticles for reinforcement. Other implementations use microparticles for the same purpose. Nanoparticles are particles with a size between one and one-hundred nanometers (nm), which include an interfacial layer integral to nanoscale matter. Microparticles are particles with a size between one and one-thousand micrometers (μm). Whether nanoparticle or microparticle ceramic particles are utilized is dependent on the needs of a particular application of an implementation.

Thus, gas atomizing MMC bar stock during processing results in a GAMMC-based feedstock material with reinforcement inside the feedstock powder particles, not merely upon the surface of such particles. The ceramic particles being within the metallic feedstock powder particles enables superior bonding of the feedstock to the substrate of a part during CSAM by providing a metallic surface prone to bonding and also a hard, ceramic particle-reinforced interior (e.g., having greater stiffness or UTS). The reinforced material allows the feedstock powder particles to strike the substrate harder during CSAM-based repairs, resulting in stronger bonding and an overall stronger cold spray layer upon the substrate. GAMMC-based feedstock possesses superior mechanical properties to conventional CSAM feedstock as discussed elsewhere herein. In some implementations, the GAMMC-based feedstock disclosed herein comprises in part ceramic particles on the surface of the feedstock powder particles. The presence of such surface-level particles causes no detrimental effects to the performance of the GAMMC-based feedstock.

In some implementations, the disclosed GAMMC-based feedstock comprises GAMMC particles as described herein, wherein the size of the GAMMC particles is selectable. This selectable size allows such implementations to be tailored to specific applications. In some such implementations, the size of the GAMMC particles is selectable within a range of fifteen micrometers to fifty-five micrometers. In other such implementations, the size of the GAMMC particles is selectable within a range of twenty-five micrometers to fifty-five micrometers.

In some implementations, the disclosed GAMMC-based feedstock comprises gas atomized metallic particles of 5056 aluminum alloy ("GAMMC 5056 feedstock"). In such implementations, when used in CSAM-based repairs of damaged parts, GAMMC 5056 feedstock yields resultant mechanical properties comparable with cold spray conducted with conventional feedstock manufactured from 7050 aluminum alloy, particularly as measured by UTS and STF. In certain applications, such GAMMC 5056 feedstock is suitable for use in semi-critical and critical structural repairs as described elsewhere herein.

In some other implementations, the disclosed GAMMC-based feedstock comprises gas atomized metallic particles of 7050 aluminum alloy ("GAMMC 7050 feedstock"). In such implementations, experimental results indicate that the GAMMC 7050 feedstock, when used in CSAM-based repairs of damaged parts, results in a ten KSI increase in tensile strength in comparison to stock 7050 aluminum alloy used in undamaged parts. In such implementations, the disclosure thus strengthens or enhances parts subject to CSAM-based repair beyond the original stock specifications of such parts.

While the GAMMC-based feedstock disclosed herein is described in the context of CSAM use cases, the disclosure is not limited to these use cases. The disclosed GAMMC-based feedstock is usable in any solid state additive manufacturing process. Other solid state additive manufacturing processes include but are not limited to friction stir additive manufacturing ("FSAM") techniques. The disclosed GAMMC-based feedstock is also useable in certain melt-based manufacturing processes.

The implementations herein provide apparatuses, methods, systems, and products for creating GAMMC-based feedstock for cold spray by conducting gas atomization of an MMC material received via an intake sub-system using an atomizer sub-system configured to conduct gas atomization of the MMC material to create GAMMC-based feedstock. Some implementations of the gas atomization system incorporate an output sub-system to output the GAMMC-based feedstock to a cold spray system in a secondary consolidation step. The disclosure herein operates at the point of CSAM feedstock preparation to create a GAMMC-based feedstock for cold spraying.

In some implementations, the produced and otherwise ready to use GAMMC feedstock (e.g., the feedstock powder 150 of FIG. 1) is heat treated to further improve the mechanical properties of any CSAM-based repair conducted using the GAMMC feedstock. This heat treatment occurs after the disclosed gas atomization is completed and the GAMMC feedstock is stable and ready to use. Thus, any defects, deformities, and other undesirous side effects of heat treatment as discussed herein cannot occur.

Unless otherwise stated, any implementation described herein as being incorporated into or being used in combination with a specific type of vehicle (e.g., an aircraft or helicopter) shall be understood to be installable into and usable with any other type of vehicle (e.g., trains, submersibles, tanks, armored personnel carriers, watercraft, etc.). Implementations of the disclosure herein are well-suited to repairing aircraft in-situ, allowing the service life of such aircraft to be maximally extended at lesser cost. Cold spray is recognized by various organizations as a solution distinct from and advantageous over thermal spray.

In particular, as aircraft enter the extreme ends of repeatedly extended service lifetimes, fleet fatigue causes cracks and other damage requiring structural repairs, part replacement, and part repair to keep the aircraft in service. This escalates the cost of keeping such aircraft flying due to requiring recurrent inspections to maintain air worthiness, eventual retrofits, and long lead times and high expenses associated with supply chain issues. Cold spray is especially well suited to perform these types of repairs to rehabilitate existing parts of such aircraft (e.g., repairs performed on aircraft components in an aircraft hangar without disassembly), potentially significantly reducing maintenance costs and also lowing downtime for military aircraft platforms. In 2008 (with revisions following in 2011 and 2015), the United States Department of Defense adopted and promulgated MIL Spec MIL-STD-3021 ("DOD Manufacturing Process Standard, Materials Deposition, Cold Spray"). The MIL-STD-3021 standard has been adopted by various other organizations around the world.

The disclosure herein is usable in a number of present military and commercial cold spray applications. Some implementations of the disclosure have the potential to save entities operating on the scale of the United States Department of Defense billions of U.S. dollars annually that would otherwise be spent on corrosion repairs. The disclosure also enables repair techniques for components that do not currently have approved repair regimens in place, allowing such components to be transitioned to a United States Department of Defense supply base, as well as enabling certain repairs to be conducted in the field, away from repair depots. Such military and commercial cold spray applications include but are not limited to:

Use by the United States Army through Maintenance Engineering Order T-7631 by the Program Office UH-60 Blackhawk for the repair of magnesium aerospace components;

Use in maintenance and repair of landing gear hydraulics for the B1 Rockwell B-1 Lancer supersonic heavy bomber;

Research by the U.S. Army Research Laboratory in collaboration with private industry for applications for additive manufacturing as diverse as near-net forming of shape charge liners, donor tubes for explosive cladding and sputter targets;

Automotive repairs;

Magnesium aerospace component repairs; and

A growing number of worldwide RDT and E programs other qualified aerospace repair procedures worldwide.

At the time of this disclosure, in contemporary, pre-existing traditional CSAM applications using conventional CSAM feedstock as defined herein, the conventional CSAM feedstock and any parts repaired using the conventional CSAM feedstock suffer issues with degradation of mechanical properties, limiting the commercially practicable applications of such traditional feedstock and parts repaired using traditional feedstock as described elsewhere herein. Without a means to improve the mechanical properties of cold spray-based repairs, the commercial economic viability of CSAM repair is severely curtailed.

At least a portion of the functionality of the various elements in the figures are in some implementations performed by other elements in the figures, and or an entity (e.g., a computer) not shown in the figures.

In some implementations, the operations illustrated in FIG. 2 and FIG. 3 are performed by a single person, a group of persons, a fully- or partially-automated system for manufacturing gas atomized metal matrix composites for cold spray, or any combination of the foregoing. As an illustration, in some implementations the heating unit, the pressurization unit, and the flow regulation unit are each be provided by distinct suppliers to a wholly separate assembler who couples the heating unit, the pressurization unit, and the flow regulation unit to form the atomizer sub-system.

While the aspects of the disclosure have been described in terms of various implementations with their associated operations, a person skilled in the art would appreciate that a combination of operations from any number of different implementations is also within scope of the aspects of the disclosure.

Exemplary Operating Environment

Figure 6:
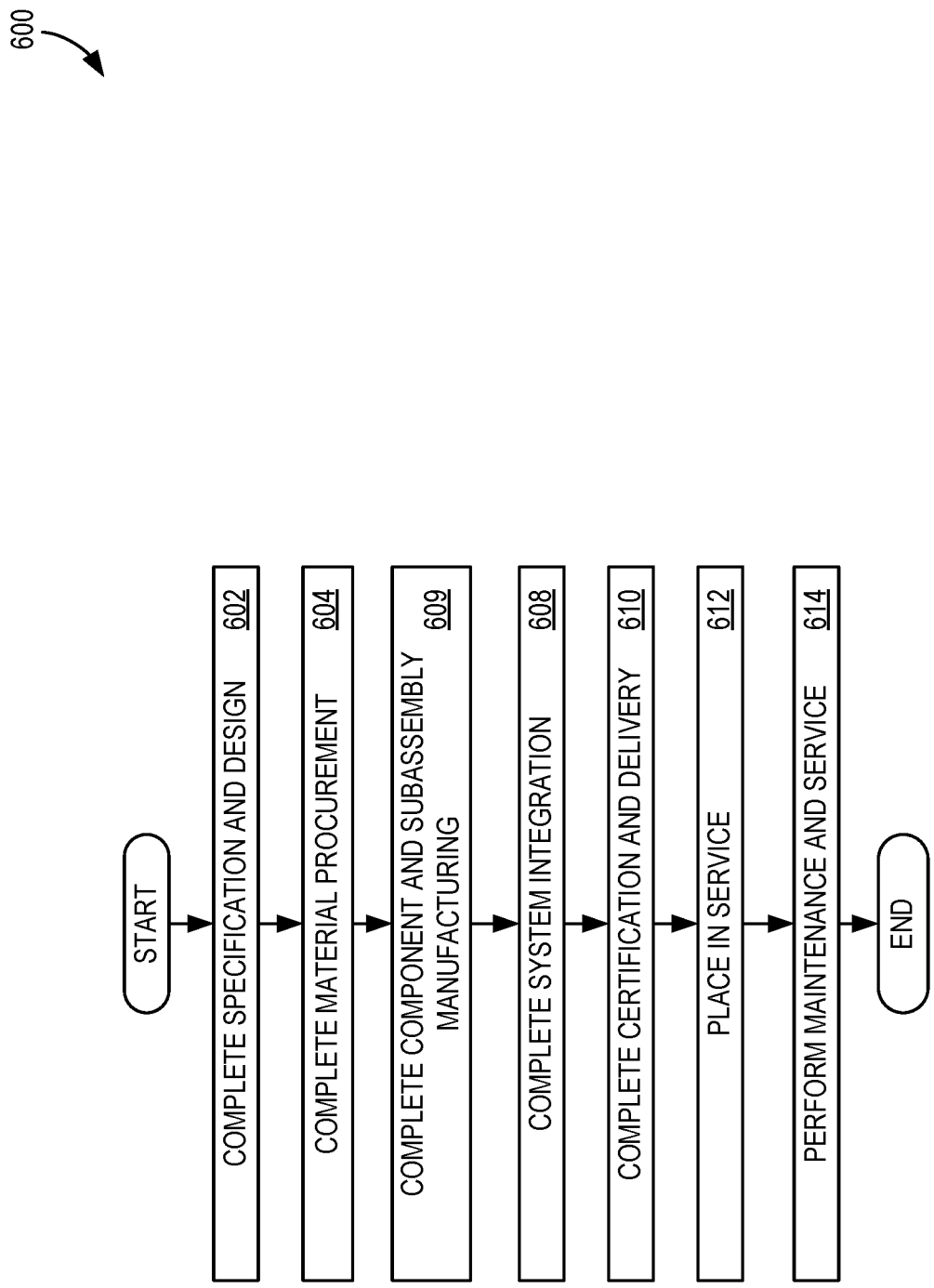
FIG. 6 is a flow chart illustrating a method for aircraft manufacturing and service in accordance with an implementation.

The present disclosure is operable within an aircraft manufacturing and service method according to an implementation as a method 600 in FIG. 6. During pre-production of the aircraft, some implementations of method 600 include specification and design of the aircraft at operation 602, and material procurement at operation 604. During production, some implementations of method 600 include component and subassembly manufacturing at operation 606 and aircraft system integration at operation 608. The aircraft undergoes certification and delivery at operation 610 in order to be placed in service at operation 612. While in service of a customer, the aircraft is scheduled for routine maintenance and service at operation 614. In some implementations, operation 614 comprises modification, reconfiguration, refurbishment, and other operations associated with maintaining the aircraft in acceptable, safe condition during ongoing flight operations. Systems and methods for cold spray additive manufacturing as disclosed herein are used during operation 614.

Each of the processes of method 600 are performable or practicable by a system integrator, a third party, or an operator (e.g., a customer). For the purposes of this disclosure, a system integrator comprises any number of aircraft manufacturers and major-system subcontractors; a third party comprises any number of vendors, subcontractors, and suppliers; and an operator comprises an airline, leasing company, military entity, service organization, and similar entities providing similar sales and leasing services.

Figure 7:
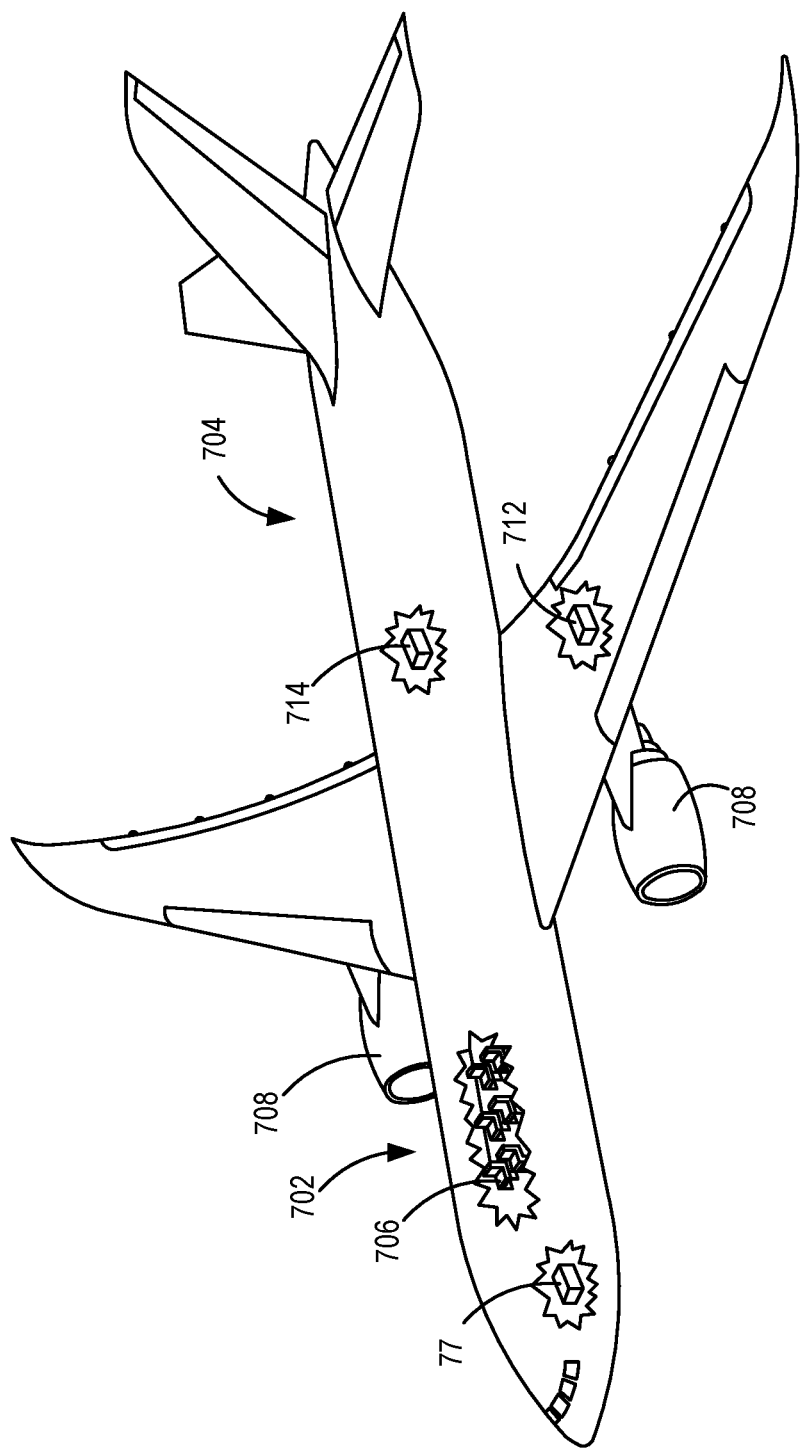
FIG. 7 is a schematic perspective view of an aircraft in accordance with an implementation.

The present disclosure is operable in a variety of terrestrial and extra-terrestrial environments for a variety of applications. For illustrative purposes only, and with no intent to limit the possible operating environments in which implementations of the disclosure operate, the following exemplary operating environment is presented. The present disclosure is operable within an aircraft operating environment according to an implementation as an aircraft 700 in FIG. 7. Implementations of the aircraft 700 include but are not limited to an airframe 702, a plurality of high-level systems 704, and an interior 706. Some implementations of the aircraft 700 incorporate high-level systems 704 including but not limited to: one or more of a propulsion system 708, an electrical system 710, a hydraulic system 712, and an environmental system 714. Any number of other systems may be included in implementations of the aircraft 700. Although an aerospace implementation is shown, the principles are applicable to other industries, such as the automotive and nautical industries.

Figure 8:
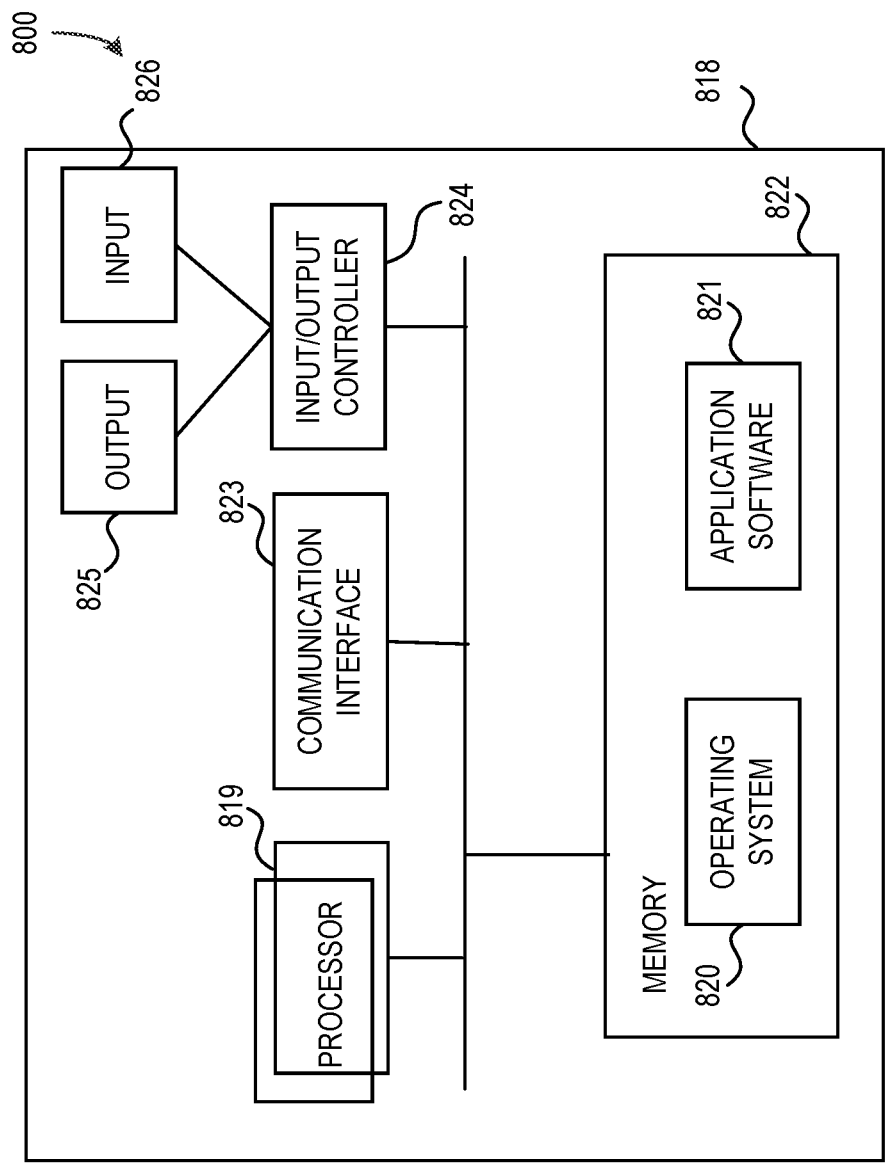
FIG. 8 is a functional block diagram illustrating a computing apparatus in accordance with an implementation.

The present disclosure is operable with a computing apparatus according to an implementation as a functional block diagram 800 in FIG. 8. In such an implementation, such as for controlling operations of components described herein, components of a computing apparatus 818 may be implemented as a part of an electronic device according to one or more implementations described in this specification. The computing apparatus 818 comprises one or more processors 819 which may be microprocessors, controllers or any other suitable type of processors for processing computer executable instructions to control the operation of the electronic device. Platform software comprising an operating system 820 or any other suitable platform software may be provided on the apparatus 818 to enable application software 821 to be executed on the device. According to an implementation, the gas atomization system for producing a feedstock powder for cold spraying as described herein may be implemented at least partially by software.

Computer executable instructions may be provided using any computer-readable media that are accessible by the computing apparatus 818. Computer-readable media may include, without limitation, computer storage media such as a memory 822 and communications media. Computer storage media, such as a memory 822, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that is usable to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, in some implementations a display or a speaker, which may be separate from or integral to the electronic device. The input/output controller 824 may also be configured to receive and process an input from one or more input devices 826, in some implementations a keyboard, a microphone or a touchpad. In one implementation, the output device 825 may also act as the input device. A touch sensitive display is one such device. The input/output controller 824 may also output data to devices other than the output device, e.g., a locally connected printing device. In some implementations, a user may provide input to the input device(s) 826 and/or receive output from the output device(s) 825.

The functionality described herein is performable, at least in part, by one or more hardware logic components. According to an implementation, the computing apparatus 818 is configured by the program code when executed by the processor 819 to execute the implementations of the operations and functionality described. Alternatively, or in addition, the functionality described herein is performable, at least in part, by one or more hardware logic components. Without limitation, illustrative types of hardware logic components that are usable include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Thus, various implementations include systems, methods, and products for creating GAMMC-based feedstock for cold spray comprising arranging a metal matrix composite (MMC) material in a gas atomization system (wherein the MMC material comprises metal particles and ceramic particles); performing gas atomization of the MMC material using the gas atomization system to atomize the MMC material; and producing a feedstock powder comprised of metal particles that are embedded with the ceramic particles from the atomized MMC material. In at least some implementations, the produced feedstock powder is a GAMMC-based feedstock powder.

Various implementations described herein describe feedstock powder comprising ceramic particles comprising at least one of aluminum oxide or titanium diboride. In such implementations, aluminum oxide or titanium diboride are substitutable for any other type of ceramic particle (or combinations of ceramic powders) suitable for use in CSAM as disclosed herein and further also suitable for the particular intended applications of a given implementation. This disclosure does not intend to exclude any type of ceramic particle unless such exclusion is explicitly stated herein.

As described herein, the present disclosure provides systems, methods, and products for creating gas atomized metal matrix composites for cold spray. The systems and methods herein efficiently and effectively construct and deploy within a cold spray additive manufacturing system suitable for use in connection with repairs of a number of moving vehicles, including but not limited to the above exemplary operating environment.

While various spatial and directional terms, such as top, bottom, lower, mid, lateral, horizontal, vertical, front and the like may be used to describe the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein is extendable or alterable without losing the effect sought, as will be apparent to the skilled person.

As used herein, "mechanical properties" of a material refer in some implementations to various measurable characteristics tending to indicate the likelihood that a material subject to forces (sometimes called "loads") while in use will either deform (e.g., elongate, compress, or twist) or otherwise break. This deformation or breakage is in some implementations a function of applied loads, time, temperature, or other physical conditions. Mechanical properties further include but are not limited to ultimate tensile strength ("UTS"), compressive strength, sheer strength, and strain-to-failure ("STF"). Degradation in the mechanical properties of a material results in degradation of structural integrity of any part comprising that material. In some implementations, such degradation includes a loss of ductility.

UTS (also referred to as tensile strength ("TS"), ultimate strength, or "Ftu") is the capacity of a material to withstand loads that tend to elongate (or pull apart) the material. UTS is the maximum stress a material can withstand under such load before deforming or breaking. UTS is measured using kilopound per square inch (kilopound/inch$^2$ or KSI) units. By comparison, compressive strength is a measurement of the ability of a material to resist compression (or pushing together) before deforming or breaking. Compressive strength is also measurable using KSI.

Sheer strength measures the capacity of a material to resist forces attempting to cause at least some portion of the internal structure of the material to slide against at least some other portion of the internal structure of the material. The greater the shear strength of a material, the less likely the material will experience structural failure in shear. Restated, shear strength of a material indicates the load that a material is able to withstand in a direction parallel to the face of the material, as opposed to perpendicular to the face of the material. Shear strength is also measurable using KSI.

STF (equivalent to elongation at break, "EAB," or "emax") indicates the ratio between an increased length of a sample of a material and an initial length of the same sample after breakage of the sample under testing at a controlled temperature. (That is, STF is keyed to the maximum elongation of the sample of a material at the moment of breakage.) STF measurements in practice reflect the ability of a material to resist changes in shape without cracking or otherwise deforming. STF is measured as a percentage or ratio—specifically, the percent of elongation of the sample of the material versus the initial length (or size) of the sample of the material.

Although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

It will be understood that the benefits and advantages described above can relate to one implementation or can relate to several implementations. The implementations are not limited to those that address every issue discussed in the Background herein or those that have any or all of the stated benefits and advantages.

The implementations illustrated and described herein as well as implementations not specifically described herein but within the scope of aspects of the claims constitute exemplary means for creating GAMMC-based feedstock for CSAM.

The order of execution or performance of the operations in implementations of the disclosure illustrated and described herein is not essential, unless otherwise specified. That is, the operations may be performed in any order, unless otherwise specified, and examples of the disclosure may include additional or fewer operations than those disclosed herein. As an illustration, it is contemplated that executing or performing a particular operation before, contemporaneously with, or after another operation is within the scope of aspects of the disclosure.

When introducing elements of aspects of the disclosure or the implementations thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

CLAUSES

The following clauses describe further aspects:

Clause Set A:

A1. A gas atomization system for producing a feedstock powder for cold spraying, comprising:
- an intake sub-system configured to receive a metal matrix composite (MMC) material, the MMC material comprising metal particles and ceramic particles;
- an atomizer sub-system configured to conduct gas atomization of the MMC material, the atomizer sub-system comprising:
- a heating unit configured to heat the MMC material to a temperature for gas atomization;
- a pressurization unit configured to apply a gas stream at a gas pressure for gas atomization;
- a flow regulation unit configured to maintain a metal flow rate for gas atomization; and
- the gas atomization comprising:
- atomizing the MMC material at the gas pressure and the metal flow rate;
- while maintaining the temperature of the MMC material;
- producing the feedstock powder comprised of the metal particles that are embedded with the ceramic particles from the atomized MMC material.

A2. The system of any preceding clause, wherein
- the temperature is in a range of a melting temperature of the MMC material to the melting temperature of the MMC material plus 300 degrees Celsius;
- the gas pressure is in a range of 10-30 bars; and
- the metal flow rate is in a range of 0.2-2 kilograms per minute.

A3. The system of any preceding clause, wherein the MMC material is a bar stock of decorated metal powder that has been consolidated; the bar stock of decorated metal powder (128) having than at least one ceramic particle (112) on an outside surface (130) of than at least one metal particle (110) thereof.

A4. The system of any preceding clause, wherein the ceramic particles comprise nanoparticles or microparticles of at least one of aluminum oxide or titanium diboride.

A5. The system of any preceding clause, further comprising an output sub-system configured to output the feedstock powder to a cold spray system in a secondary consolidation step.

A6. The system of any preceding clause, wherein the cold spray system gas atomizes the supplied feedstock powder.

A7. The system of any preceding clause, wherein gas atomization comprises at least one of a non-cold spray gas atomizing process or a cold spray gas atomizing process.

Clause Set B:

B1. A method for producing feedstock for cold spraying, the method comprising:
- arranging a metal matrix composite (MMC) material in a gas atomization system, the MMC material comprising metal particles and ceramic particles;
- performing gas atomization of the MMC material using the gas atomization system to atomize the MMC material; and
- producing a feedstock powder comprised of metal particles that are embedded with the ceramic particles from the atomized MMC material.

B2. The method of any preceding clause, wherein the MMC material is a bar stock of decorated metal powder that has been consolidated; the bar stock of decorated metal powder having the at least one ceramic particle on an outside surface of the at least one metal particle thereof.

B3. The method of any preceding clause, wherein the ceramic particles comprise nanoparticles or microparticles of at least one of aluminum oxide or titanium diboride.

B4. The method of any preceding clause, further comprising supplying the feedstock powder to a cold spray system in a secondary consolidation step.

B5. The method any preceding clause, wherein the cold spray system gas atomizes the supplied feedstock powder.

B6. The method of any preceding clause, wherein performing the gas atomization comprises atomizing the MMC material at a gas pressure in a range of 10-30 bars and a metal flow rate in a range of 0.2-2 kilograms per minute, wherein the MMC material is at a temperature in a range from the melting temperature of the MMC material to the melting temperature of the MMC material plus 300 degrees Celsius.

B7. The method of any preceding clause, wherein the gas atomization comprises at least one of a non-cold spray gas atomizing process or a cold spray gas atomizing process.

Clause Set C:

C1. A feedstock for cold spraying prepared by a process comprising the steps of:
- arranging a metal matrix composite (MMC) material in a gas atomization system, the MMC material comprising metal particles and ceramic particles;
- performing gas atomization of the MMC material using the gas atomization system to atomize the MMC material; and
- producing a feedstock powder comprised of metal particles that are embedded with the ceramic particles from the atomized MMC material.

C2. The feedstock prepared by any preceding process, wherein the MMC material is a bar stock of decorated metal powder that has been consolidated; the bar stock of decorated metal powder having an at least one ceramic particle on an outside surface of an at least one metal particle thereof.

C3. The feedstock prepared by any preceding process, wherein the ceramic particles comprise nanoparticles or microparticles of at least one of aluminum oxide or titanium diboride.

C4. The feedstock prepared by any preceding process, wherein performing the gas atomization further comprises atomizing the MMC material at a gas pressure in a range of 10-30 bars and a metal flow rate in a range of 0.2 to 2 kilograms per minute, wherein the MMC material is at a temperature in a range from the melting temperature of the MMC material to the melting temperature of the MMC material plus 300 degrees Celsius.

C5. The feedstock prepared by any preceding process, wherein the gas atomization comprises at least one of a non-cold spray gas atomizing process or a cold spray gas atomizing process.

C6. The feedstock prepared by any preceding process, wherein use of the feedstock in cold spraying-based repair of a part improves mechanical properties of the repaired part.

What is claimed is:

1. A method for producing feedstock for cold spraying, the method comprising:
- receiving, by an intake of a gas atomization system, a metal matrix composite (MMC) material comprising metal particles and ceramic particles on an outside surface of a plurality of the metal particles;

providing the received MMC material to an atomizer;

performing, by the atomizer, gas atomization of the MMC material to atomize the MMC material at a gas pressure of at least 10 bars; and as a result of the gas atomization, producing a feedstock powder comprised of metal particles that are embedded with the ceramic particles from the atomized MMC material.

2. The method of claim 1, wherein the MMC material is a bar stock of decorated metal powder that has been consolidated, the bar stock of decorated metal powder having an at least one ceramic particle on an outside surface of the at least one metal particle thereof.

3. The method of claim 2, wherein the ceramic particles comprise at least one of nanoparticles or microparticles of at least one of aluminum oxide or titanium diboride.

4. The method of claim 1, further comprising supplying the feedstock powder to a cold spray system in a secondary consolidation step.

5. The method of claim 4, wherein the cold spray system gas atomizes the supplied feedstock powder.

6. The method of claim 1, wherein performing the gas atomization comprises atomizing the MMC material at a gas pressure in a range of the at least 10 bars to 30 bars and a metal flow rate in a range of 0.2-2 kilograms per minute, wherein the MMC material is at a temperature in a range from the melting temperature of the MMC material to the melting temperature of the MMC material plus 300 degrees Celsius.

7. The method of claim 1, wherein the gas atomization comprises at least one of a non-cold spray gas atomizing process or a cold spray gas atomizing process.

* * * * *